(12) United States Patent
Inskip et al.

(10) Patent No.: US 8,396,983 B1
(45) Date of Patent: Mar. 12, 2013

(54) PREDICTIVE ADAPTIVE MEDIA STREAMING

(75) Inventors: Thomas Inskip, Kirkland, WA (US); Duncan MacLean, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/419,041

(22) Filed: Mar. 13, 2012

(51) Int. Cl.
*G06F 15/16* (2006.01)
(52) U.S. Cl. ......... 709/233; 709/203; 709/231; 709/232
(58) Field of Classification Search .................. 709/200, 709/203, 233
See application file for complete search history.

(56) References Cited

U.S. PATENT DOCUMENTS

| | | | |
|---|---|---|---|
| 7,240,162 B2 | 7/2007 | de Vries | |
| 2005/0155072 A1 | 7/2005 | Kaczowka et al. | |
| 2006/0117357 A1 | 6/2006 | Surline | |
| 2006/0294128 A1* | 12/2006 | Gottschalk | 707/101 |
| 2007/0097816 A1* | 5/2007 | Van Gassel | 369/47.33 |
| 2007/0140647 A1 | 6/2007 | Kusunoki et al. | |
| 2010/0235542 A1* | 9/2010 | Visharam et al. | 709/246 |
| 2012/0059951 A1* | 3/2012 | Gutarin et al. | 709/233 |

OTHER PUBLICATIONS

Office Action from U.S. Appl. No. 13/419,048, dated Jun. 5, 2012.
Wes Simpson, "DASHing for a Streaming Standard," TVTechnology, http://www.tvtechnology.com/article/dashing-for-a-streaming-standard/210842, dated Nov. 21, 2011.
"Adaptive bitrate streaming," Wikipedia, http://en.wikipedi.org/wiki/Adaptive_bitrate_streaming, printed from the World Wide Web on Feb. 29, 2012.
A. Lilleste and L. Lundgren, "Media Streaming for Infotainment," Chalmers University of Technology, Department of Computer Science and Engineering, Jun. 2009.

* cited by examiner

*Primary Examiner* — Djenane Bayard
(74) *Attorney, Agent, or Firm* — McDonnell Boehnen Hulbert & Berghoff LLP

(57) ABSTRACT

A method and corresponding apparatus for controlling streaming of media content from a server to a client. A computing device predicts the bit rate of an upcoming portion of the media content for each of a plurality of variable bit-rate versions of the media content, and uses the predicted bit rates, as well as a measure of network bandwidth, as a basis to select one of the variable bit-rate versions to be streamed to the client. By repeating this prediction and selection function on a sliding window basis over the course of the media content, the selection of variable bit-rate version can dynamically change, to help accommodate variations in bit rate throughout the media content as well as variations in network bandwidth.

30 Claims, 10 Drawing Sheets

PREDICTIVE ADAPTIVE MEDIA STREAMING

BACKGROUND

Unless otherwise indicated herein, the materials described in this section are not prior art to the claims and are not admitted to be prior art by inclusion in this section.

With advances in networking and computing technology, it is now commonplace for devices to receive and play out media being streamed in real time from a network server. In practice, for instance, a device may be programmed or otherwise arranged with a media player that provides a user interface at which the device can receive a user request for streaming playout of particular media. The media player may then cause the device to interact with a server according to an agreed protocol (such as the Hypertext Transfer Protocol (HTTP), the Real Time Streaming Protocol (RTSP), the Real-time Transport Protocol (RTP), the Real Time Control Protocol (RTCP), and the Real Time Messaging Protocol (RTMP)), to request the server to stream the particular media. As the device receives the media streamed in response from the server, the device may then play out the media at the user interface for the user's enjoyment.

SUMMARY

Disclosed herein are methods and devices related to controlling streaming of media from a server.

In one respect, for instance, disclosed is a method for controlling streaming of media content from a server to a client. In practice, the server would have access to a plurality of variable bit rate (VBR) versions of the media content. The method may then involve carrying out the following functions for each of a plurality of sequentially occurring portions of the media content while the media content is being streamed from the server to the client: (i) identifying, in advance of the portion of the media content being received by the client, one or more of the VBR versions of the media content, with the identifying being based at least in part on determining that the portion of media content in each of the one or more VBR versions has a bit rate lower than a bandwidth threshold, (ii) selecting, from the determined one or more VBR versions of the media content, a highest bit-rate VBR version of the media content, and (iii) causing the selected VBR version of the media content to be streamed from the server to the client.

In another respect, disclosed is a non-transitory computer readable medium having stored thereon instructions executable to cause a device to carry out the following functions for each of a plurality of sequentially occurring portions of media content during streaming of the media content from a server to the device: (i) determining network bandwidth for communication from the server to the device, (ii) identifying, in advance of the portion of the media content being received by the device, one or more of a plurality of VBR versions of the media content, with the identifying being based at least in part on the portion of the media content in each of the one or more VBR versions having a bit rate less than or equal to the determined network bandwidth, (iii) selecting, from the identified one or more VBR versions of the media content, a highest bit-rate VBR version of the media content, and (iv) transmitting to the server a control signal requesting the server to stream the selected VBR version of the media content to the device.

Further, in still another respect, disclosed is a computing device that includes a network communication interface, a user interface, a processor, data storage, and program instructions stored in the data storage and executable by the processor to carry out various functions. The functions may include (a) receiving, by the network communication interface, media content being streamed to the computing device from a server, (b) playing out, at the user interface, the media content being received, and (c) while receiving the media content being streamed to the computing device from the server, periodically (i) determining a measure of network bandwidth for communication from the server to the computing device, (ii) evaluating a plurality of VBR versions of the media content and selecting, from the plurality of VBR versions, a highest bit-rate VBR version having a bit rate over a next sliding window of the media content that will be less than or equal to the determined network bandwidth, and (iii) transmitting by the network communication interface to the server a request for the server to stream the selected VBR version to the computing device.

These, as well as other aspects, advantages, and alternatives will become more apparent to those of ordinary skill in the art by reading the following detailed description, with reference where appropriate to the accompanying drawings.

Further, it should be understood that the description provided in this summary section and elsewhere in this document is intended to serve as an example only. Thus, other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in various suitable combinations and locations.

DETAILED DESCRIPTION

Figure 1:
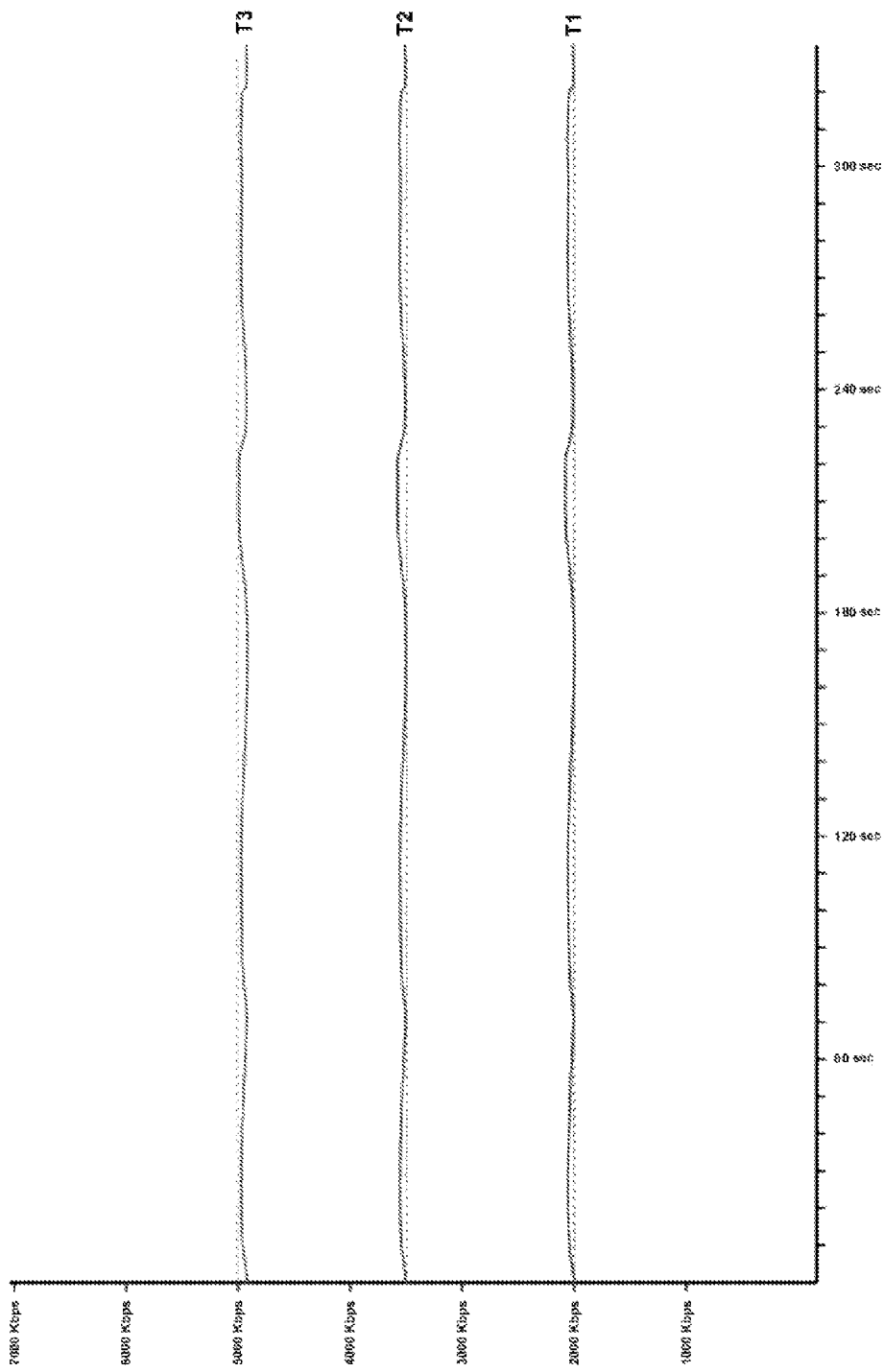
FIG. 1 is a graph of example constant bit rate (CBR) versions of media content.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

In general, encoding real-time media such as audio or video may involve converting a raw digitized version of the media to a compressed form suitable for transmission or storage. An encoder-decoder (codec) may thus operate to receive the raw bit stream representing the media and to apply an algorithm that compresses each sequential time interval of that bit stream, so as to represent each time interval with fewer bits than in the raw bit stream. This compression process can help to facilitate real-time media streaming and playout, by allowing media to be transmitted and received quickly enough over a network that supports limited transmission speed or "bandwidth". In particular, by representing sequential time intervals of the media with fewer bits, less bandwidth is required to support transmission of the media in real time to the requesting device.

In practice, the codec that is used to encode real-time media can apply constant bit-rate (CBR) encoding or variable bit-rate (VBR) encoding. CBR encoding converts each sequential time interval of the media to a given quantity of data, with that quantity remaining largely the same over the duration of the media. Thus, the network bandwidth requirements for streaming CBR encoded media would remain largely the same over time.

VBR encoding, on the other hand, involves using a higher bit rate for encoding some time intervals of the media than for encoding other time intervals of the media. VBR encoding may result in better quality compared with CBR encoding, since more data is used to represent certain sections of the media that could benefit from it (such as higher detail video, or fast motion video for instance). Further, VBR encoding can make better use of network bandwidth, as more bandwidth can be used for streaming the higher bit-rate sections of the media while less bandwidth can be used for streaming the lower bit-rate sections of the media.

The network bandwidth that is effectively available for transmission of media from a server to a client device may vary over time due to a number of factors, including but not limited to changes in load at the server, changes in load at the client, and changes in load in the communication path between server and the client.

To accommodate such variations in network bandwidth, a streaming media server may have (or generate on the fly) various different bit-rate versions (i.e., different encodings) of media content and may stream to a requesting client device the highest bit-rate version that the current network bandwidth can support. In practice, for instance, the client device may have an index that specifies bit rates of the various versions accessible for streaming, and the client may determine the network bandwidth and select the highest bit-rate version that the determined network bandwidth should support (e.g., the version having a bit rate that is less than or equal to the determined network bandwidth). The client may then send to the server a request for the server to stream that requested version, and the server may responsively stream that requested version to the client. Alternatively, the client may determine the network bandwidth and send to the server an indication of the determined network bandwidth, and the server may the select and stream to the client the highest bit-rate version that the determined network bandwidth should support.

This process of selecting a bit-rate version based on network bandwidth can be done once at the beginning of the streaming media session (as a static adaptive streaming process) or dynamically to adjust to varying network conditions during streaming (as a dynamic adaptive streaming process). Further, this process can be carried out for CBR encoded media and for VBR encoded media.

To appreciate this process with respect to CBR encoded media, consider the graph of FIG. 1, which shows the bit rate for a piece of video media encoded at three different bit rates: 2000 kbps (T1), 3500 kbps (T2), and 5000 kbps (T3), over a five minute interval. Given these fairly constant bit rate encoded versions of the media content, if the available network bandwidth at the start is 4000 kbps, the client may request the server to stream version T2, since that is the highest bit-rate version that can be streamed in the available 4000 kbps bandwidth and can thus arrive at the client fast enough for seamless playout. If at some point the network bandwidth then drops to 3000 kbps, the client may request the server to transition to streaming version T1, since that would then be the highest bit-rate version that can be streamed in the available 3000 kbps bandwidth and can arrive at the client fast enough for seamless playout. Thus, as the network bandwidth decreases, streaming can continue, albeit with a lower bit-rate version of the media content. Likewise, if the network bandwidth increases, streaming can transition back to a higher bit-rate version of the media content.

Figure 2:
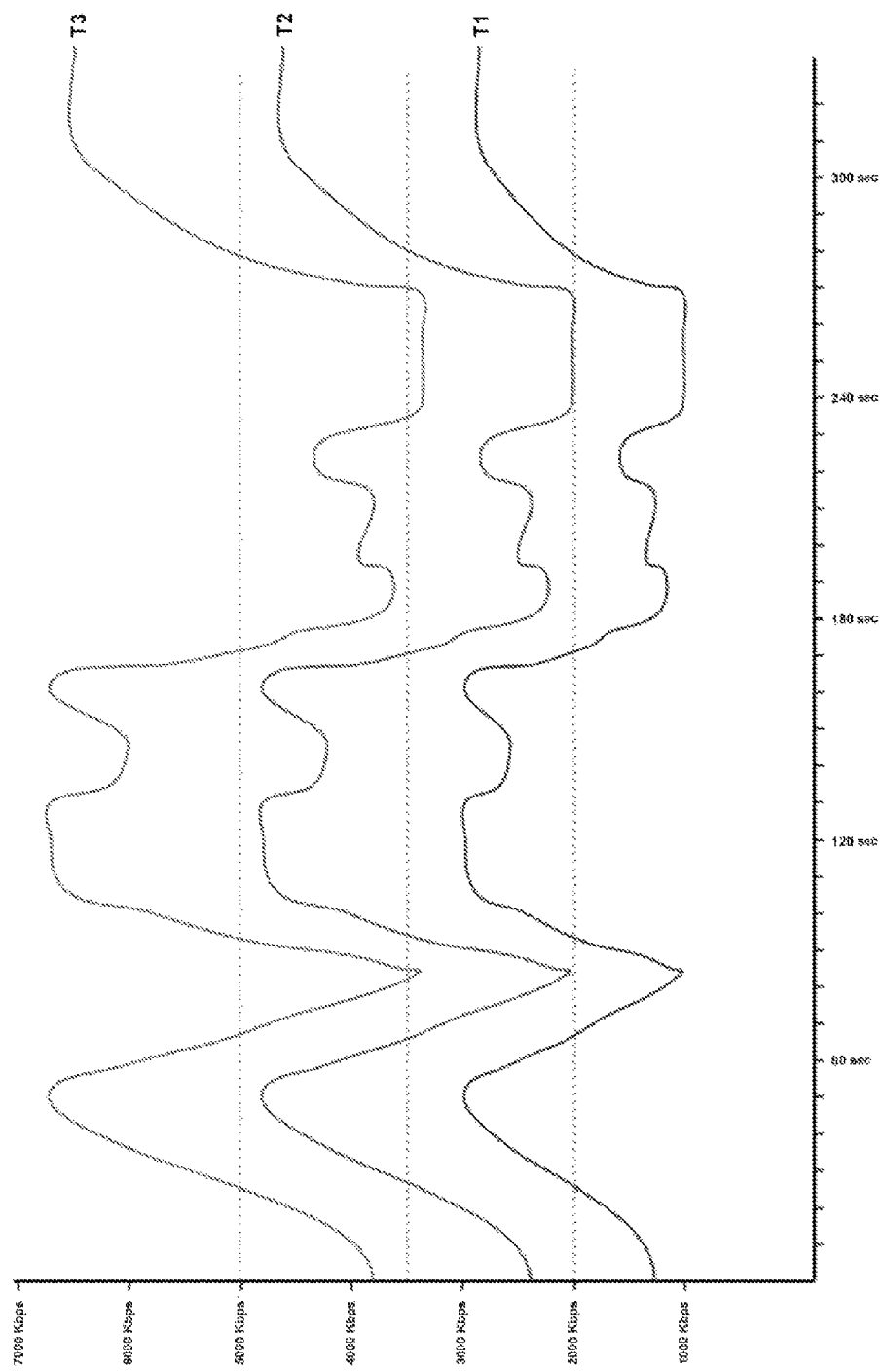
FIG. 2 is a graph of example VBR versions of media content, depicting an average target bit rate per version

This same process can be carried out with respect to VBR encoded media. FIG. 2, for instance, depicts the varying bit rate of a piece of media content encoded at three different bit-rate levels, showing a five minute interval. As shown in this example, the actual bit rate of each version varies significantly over time. A dashed line depicted through each version then represents what might be considered a "target" bit rate (e.g., average bit rate) for each version, again: 2000 kbps (T1), 3500 kbps (T2), and 5000 kbps (T3). Using these target bit rates as the point of comparison with varying network bandwidth, if the available network bandwidth at the start is 4000 kbps, the client may request the server to stream version T2, since that is the highest bit-rate version that can be streamed at at least its target bit rate (3500 kbps) in the available 4000 kbps bandwidth. And again, if the network bandwidth then drops at some point to 3000 kbps, the client may request the server to transition to streaming version T1, since that is then the highest bit-rate version that can be streamed at at least its target bit rate (2000 kbps) in the available 3000 kbps bandwidth.

Applying this process with respect to streaming of VBR encoded media, however, turns out to be more complicated in practice, as there is an increased risk that the varying media bit rate and network bandwidth could cause the client's playback buffer (adaptive streaming buffer) to run dry, thus stalling playback. In particular, if the client uses the average bit rate as the point of comparison, any sections of the media content that have an actual bit rate higher than the network bandwidth may not arrive at the client quickly enough for playout at their required bit rate. As a result, playback would be interrupted as the client waits for additional data to arrive. For instance, with the VBR versions shown in FIG. 2, if the current network bandwidth is 4000 kbps and the client thus selects version T2 (having a target bit rate of 3500 kbps), a problem could arise from about 100 seconds through 170 seconds, where the media bit rate would rise above the 4000 kbps network bandwidth, making it possible to critically drain the client's playback buffer.

Figure 3:
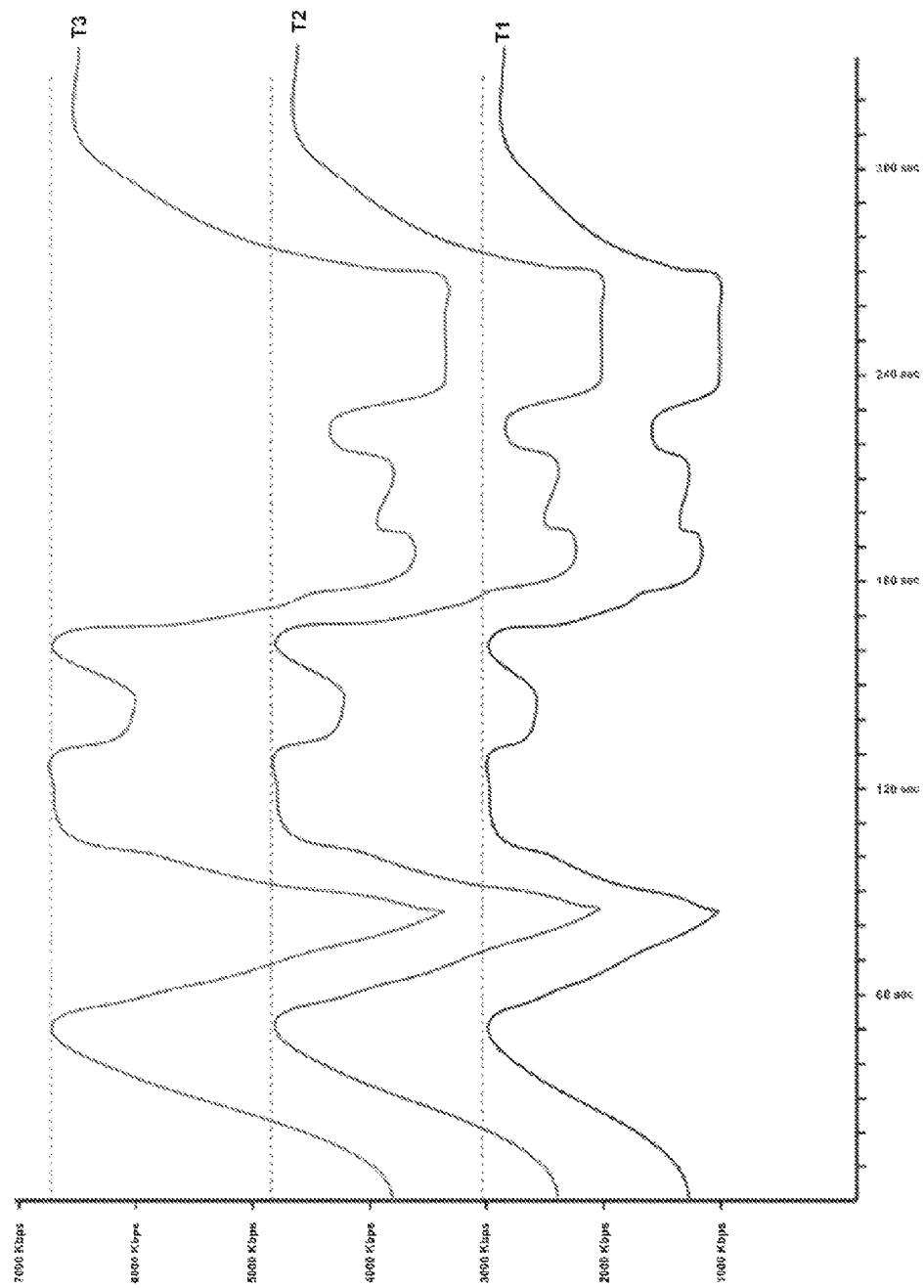
FIG. 3 is a graph of the example VBR versions of FIG. 2, depicting a maximum target bit rate per version

One way to deal with this problem is to apply a "conservative factor," such as a multiplier of the average bit rate, or a maximum bit rate, as the point of comparison for each VBR version of the media content. Referring to FIG. 3, for instance, the dashed line at each VBR version represents the maximum bit rate of that version. By using that maximum bit rate as the point of comparison with the network bandwidth, the client can help avoid having its playback buffer run dry, as the selected VBR version would always be less than or equal to the most recently determined network bandwidth. On the other hand, a downside of this conservative approach is that the process will not make optimal use of available bandwidth.

The present method provides an advanced process that may help to make more optimal use of network bandwidth while reducing the risk of a buffer underrun. This method, which can be called predictive adaptive media streaming, may involve predicting for each of a series of upcoming sections of the media (e.g., time intervals ("time bound") or data quantity intervals ("data bound")) what the bit rate of each VBR version will be in that section, and using those predicted bit rates as a point of comparison with network bandwidth so as to select a VBR version to be streamed to the client. This process may advantageously be repeated on a sliding window basis (or, alternatively, with non-overlapping (i.e., mutually exclusive) windows), so as to provide continual bit rate predictions over the course of the media and to continually use the latest predictions of upcoming bit rate as a basis to select a VBR version to be streamed.

Figure 4:
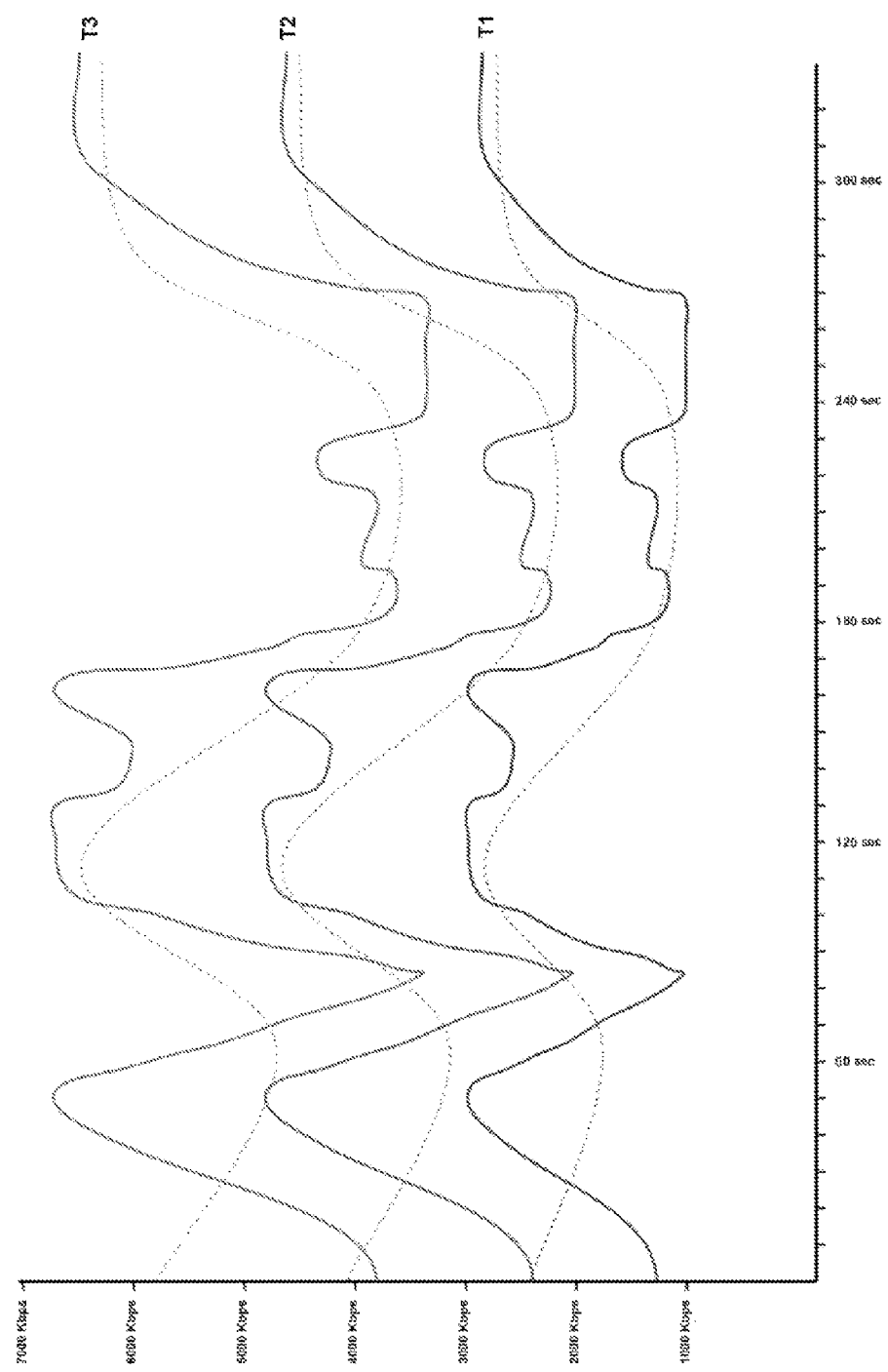
FIG. 4 is a graph of the example VBR versions of FIG. 2, depicting predictive bit rates of each version.

FIG. 4 helps to illustrate an example of this process where the upcoming bit rate of each VBR version is predicted every second as an average upcoming bit rate on a sliding window basis, over a sliding window of 30 seconds or 5 Megabytes. In the graph of FIG. 4, the predictive bit rate is plotted as a dashed line through each VBR version, effectively smoothing out the bit-rate curve per version. At any one time, this predictive bit rate per VBR version represents the average bit rate for an upcoming window of the media in that VBR version, and the predictive bit rate thus varies over the course of the media content as the upcoming average bit rate varies over the course of the media content.

With the predictive bit rates shown in FIG. 4, if we assume for simplicity that the network bandwidth is 4000 kbps throughout, VBR version T2 would be selected at about 20 seconds, since, of the three VBR versions, the predicted bit rate of version T2 would have the highest predicted bit rate that would be less than or equal to the network bandwidth. Beginning at about 90 seconds, however, the predicted bit rate of version T2 would be above the network bandwidth, and version T1 would instead be selected, since version T1 would then have the highest predicted bit rate that would be less than or equal to the network bandwidth. In turn, at about 140 seconds, as the predicted bit rate of version T2 falls back below the network bandwidth, version T2 would again be selected because it would have the highest predicted bit rate that would be less than or equal to the network bandwidth. And starting at about 180 seconds, version T3 would then fall below the network bandwidth and would therefore be selected because it would have the highest predicted bit rate that would be less than or equal to the network bandwidth.

Notably in this example, the selection of version T3 beginning at about 180 seconds may help to maximize playback quality at that point (by streaming a higher bit-rate version of the media). Yet this would not have occurred with the other discussed approaches to adaptive streaming. This shows by way of example how the present method can be used to improve media streaming.

Note also that many variations from the above example are possible. For example, the prediction of bit rate for each upcoming window of the media content could be a measure other than average. For instance, for each upcoming window, the prediction could be a maximum bit rate of the media content or could be a more complex statistical prediction, based on averages, maxima, or other features.

As another example, variations in the prediction interval and window-size parameters are possible as well. For instance, the interval at which each of the predictions is made could be constant or variable, could be other than one second, and could be a time interval or a data interval. Optimally, the interval may be as small as processing power and other resources would allow, so as to provide the most relevant upcoming prediction of bit rate. Further, the window size over which the prediction of upcoming bit rate is made could also be of constant or variable size and could be other than 30 seconds or 5 Megabytes. For instance, the window size may be small enough to realistically gauge upcoming bit rate so as to help avoid a buffer underrun.

In practice, the generation of predictive bit rates per VBR version could be carried out by the client, the server, or any other computing entity based on an index that defines the variable bit rate of each VBR version.

The client, for instance, could carry out this process while the server is streaming the media content to the client, with each window of prediction being from the latest point in the media content so far received (or some offset of that point) for example. Using the example parameters noted above, for instance, every second the client may predict for each VBR version a representative bit rate of the media for an upcoming section that starts at the latest media file position received by the client and extends forward 30 seconds or 5 Megabytes in the media file. (As a result, the prediction window might encompass a piece of the media content that has already left the server but has not yet arrived at the client.) And the client may select the VBR version that has the highest predicted bit rate that is less than or equal to a latest measure of network bandwidth, and may request the server to stream that selected VBR version to the client.

Alternatively, the client could carry out this prediction (per VBR version) for each of a series of windows of the media content at some earlier time such as before the streaming media session begins, thus establishing for each VBR version data such as that represented by the dashed line in FIG. 4. As streaming progresses, the client may then continually (e.g., at the same or another prediction interval) use the previously established predictions as a basis to select the VBR that has the highest predicted bit rate less than or equal to a latest measure of network bandwidth, and may request the server to stream that selected VBR version to the client.

Still alternatively, the server could carry out this process while the server is streaming the media content to the client, with each window of prediction being from the latest point in the media content so far streamed from the server (or some offset of that point) for example. At each prediction interval, the server may thus predict the upcoming bit rate of each VBR version and may select the VBR version that has the highest predicted bit rate that is less than or equal to a latest measure of network bandwidth, and the server may then stream that selected VBR version to the client.

Yet alternatively, the server or another entity could carry out this prediction (per VBR version) for each of a series of windows of the media content at some earlier time such as before the streaming media session begins, thus establishing for each VBR version data such as that represented by the dashed line in FIG. 4. That predictive bit rate data could be provided to the client (e.g., as part of the media file index or in some other manner) for use by the client as a basis to select and request VBR versions as streaming progresses, or could be provided to the server for use by the server as a basis to select VBR versions to stream to the client as streaming progresses. Other arrangements are possible as well.

In practice, the prediction of upcoming bit rate for a given VBR version of the media content will take into account data that indicates (e.g., specifies or otherwise defines or establishes) the upcoming bit rate of the VBR version over time. As noted above, for instance, the media content at issue may have an associated index, and that index may provide data that can be used to establish the predictive bit rates.

For example, the media content of each VBR version may be divided into sequential portions called segments or chunks, and the index may specify for each portion the data size of the portion and the duration of the portion. By reference to the index, a computing device may thus compute a bit rate per portion of the VBR version as the indicated data size divided by the duration. Further, the computing device may compute the average or other statistical measure of bit rate across a number of such portions defining an applicable time or data window. Thus, the bit rate prediction may encompass a window spanning multiple upcoming chunks of the VBR version.

As another example, for each VBR version, the media file index may map time positions of the media content to file positions in the media content file, such as file offsets indicating how far into the file the respective time position of the media content is located. By reference to such an index, a computing device may thus compute a bit rate for any section of the media file by computing the data size of the section as the difference between the indicated starting and ending file positions of the section, and dividing that data size by the corresponding time duration of the portion. More particularly, if the starting time of a section is x, the starting file position is fp(x), the time duration is n, and the ending file position is fp(x+n), the bit rate of the section is (fp(x+n)−fp(x))/n. Furthermore, if the file positions are measured in bytes rather than bits, this value can be converted to bits by multiplying it by 8. (The term "bit rate" as used herein, however, is not necessarily limited to bits and could just as well be broadly characterized as "data rate," whether in bits, bytes, or other data quantities, and whether per second or per other unit time.)

Figure 5:
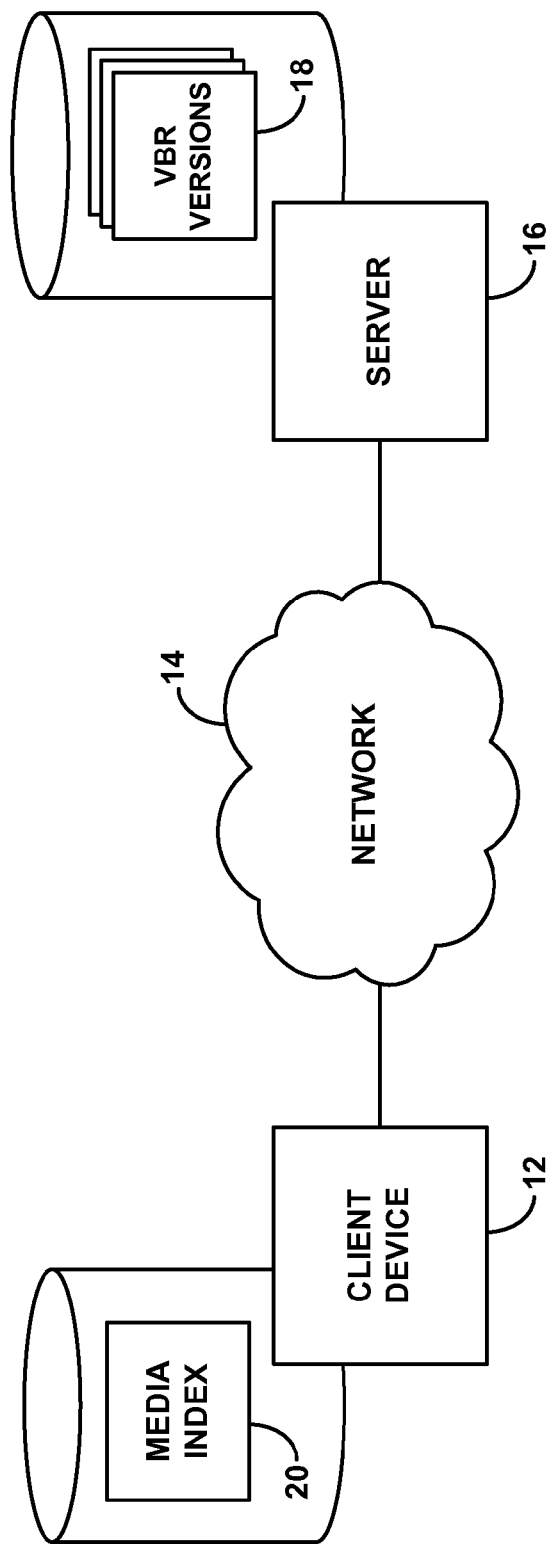
FIG. 5 is a simplified block diagram of network arrangement in which the present method can be implemented.

FIG. 5 is next a simplified block diagram of a network arrangement in which an example of the present method can be implemented. As shown in FIG. 5, the network arrangement includes a client device 12, a network (e.g., the Internet or other network) 14, and a server 16, with the server having access to multiple VBR versions 18 of particular media content, and the client having access to an media index 20 that defines varying bit rate for each VBR version.

With this arrangement, the client 12 may set up a streaming media session through which the server 16 will stream the media content to the client via the network 14. For instance, the client may send an RTSP DESCRIBE request to the server and may receive in response from the server an RTSP DESCRIBE reply that designates one or more streams (such as audio and video for instance) that the server can stream to the client, with one such stream for instance defining the media content at issue. Further, the client may request and receive from the server or from another entity the index 20 for the media content.

By reference to the index, the client may then predict for each VBR version of the media content a bit rate of a first portion of the media content (e.g., a first window). Further, the client may determine a current measure of network bandwidth. The client may then compare the predicted bit rate for the upcoming portion of each VBR version with the network bandwidth so as to determine one or more of the VBR versions having a predicted bit rate for that upcoming portion that is less than or equal to the determined network bandwidth. Further, of the one or more determined VBR versions, the client may then select that VBR version having the highest predicted bit rate in the upcoming portion. The client may then send to the server an RTSP PLAY request for the server to stream the selected VBR version, such as by designating the VBR version in a parameter in the request. The server may then begin streaming the requested VBR version of the media content to the client, and the client may begin receiving, buffering, and playing out the streamed media content.

With continued reference to the index, the client may then similarly predict bit rates of the VBR versions for a next upcoming portion of the media content, the client may again determine a current measure of network bandwidth, and the client may again select the VBR version having the highest predicted bit rate for that next upcoming portion that is less than or equal to the determined network bandwidth.

If the selected VBR version is the version that the server is currently streaming to the client, then the client need not take any action. However, if the selected VBR version differs from the version that the server is currently streaming to the client, then the client may send a control signal to the server that causes the server transition to streaming the selected VBR version. For instance, the client could send to the server an RTSP PLAY containing a switch-stream header that designates the current VBR version and requests the server to transition to the new, selected VBR version. Alternatively, the client could send to the server another RTSP request, an RTMP request, an RTCP request, an HTTP request, or any other command that the server would be arranged to interpret as a request to transition to streaming the new VBR version. The server may then responsively transition to streaming the new VBR version, optimally doing so seamlessly over time (effectively splicing the newly selected VBR version to the old VBR version).

Figure 6:
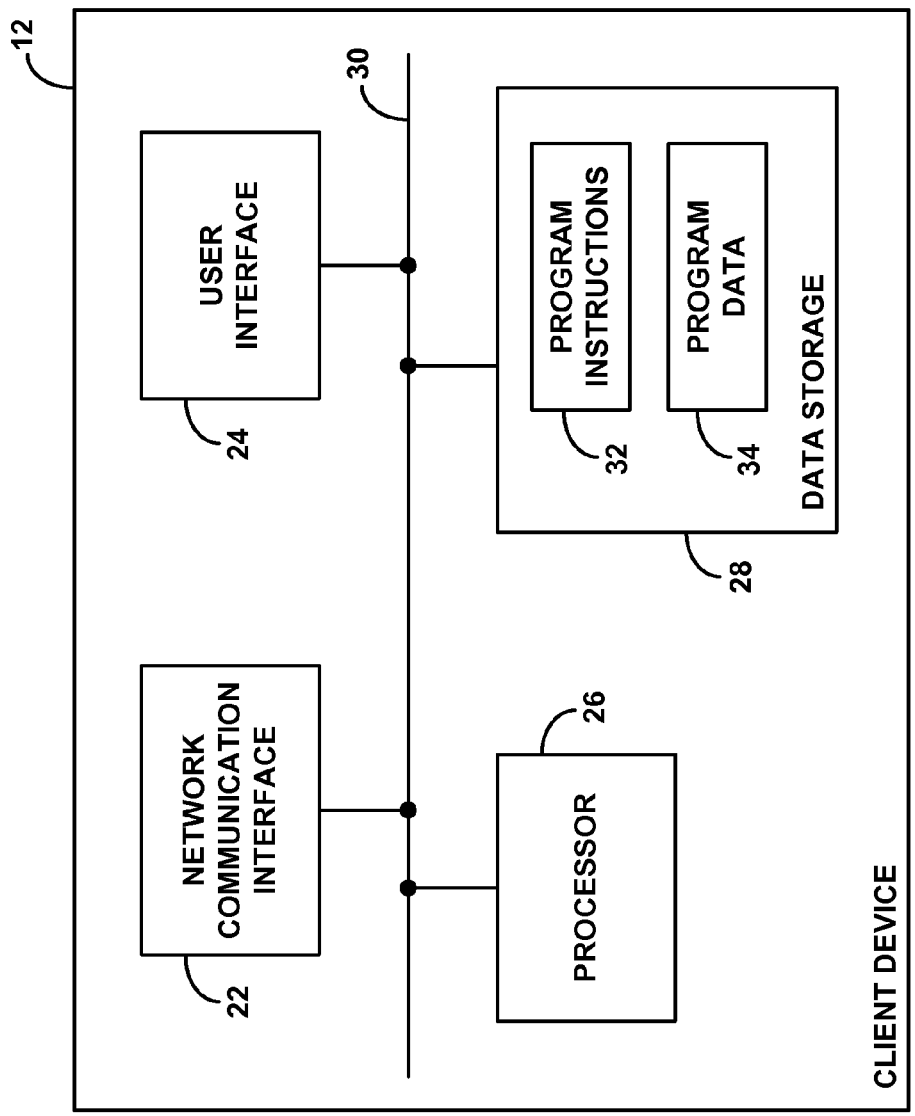
FIG. 6 is a simplified block diagram of a client device operable within the method.

Client device 12 can be any computing device that is arranged to request and receive streaming media and to play out the media as the media is being received. For example, the client device may be a personal computer, a tablet computer, a handheld cell phone or other communication device, an integrated audio or video player, a gaming device, or any other device now known or later developed. FIG. 6 is a simplified block diagram showing components that can be included in such a device to facilitate carrying out aspects of the method in practice.

As shown in FIG. 6, the example client device includes a network communication interface 22, a user interface 24, a processor 26, and data storage 28, all of which may be coupled together by a system bus or other connection mechanism 30.

Network communication interface 22 may comprise a wired or wireless interface arranged to allow client 12 to communicate on network 14 and with entities via network 14, such as with server 16 for instance. For example, the network communication interface 22 may comprise a wired or wireless Ethernet interface for communication on a local area network and in turn via a router and/or one or more other network elements with entities on network 14. As another example, the network communication interface may comprise a cellular wireless interface, arranged to engage in air interface communication with a radio access network according to a protocol such as LTE, WiMAX, CDMA, GSM, or the like, and via the radio access network with entities on network 14. Other examples are possible as well.

User interface 24 may enable the client 12 to interact with a user of the client and may thus comprise output components such as a display screen, an audio speaker, and the like, and input components such as a keyboard, camera, touch-pad or touch-screen, and the like. Further, the user interface 24 may include circuitry for converting media from digital to analog form, to facilitate playout of digitized media to a user.

Processor 26 may comprise one or more general purpose processors (e.g., INTEL microprocessors) and/or one or more special purpose processors (e.g., application specific integrated circuits, digital signal processors, etc.) If processor 26 includes multiple processors, the processors may be arranged to work in combination (e.g., in parallel) or separately. Further, processor 26 may be integrated in whole or in part with network communication interface 22 or one or more other components.

Data storage 28 may then comprise one or more volatile and/or non-volatile storage components, such as magnetic, optical, organic, flash, or other types of storage now known or later developed, and may be integrated in whole or in part with processor 26 and/or may be removable from client 12 or externally connected (through wired or wireless means) with client 12. As shown, data storage 28 contains program instructions 32 and program data 34. In general, the program instructions 32 may be executable by processor 26 to carry out various client functions described herein. Alternatively, some or all such functions could be carried out by various other machine implementations. Program data 34 may then include data such as received media content buffered for playout, a media file index, and data defining a graphical user interface that the client can present on user interface 24 to facilitate user requesting of streaming media and the like.

Figure 7:
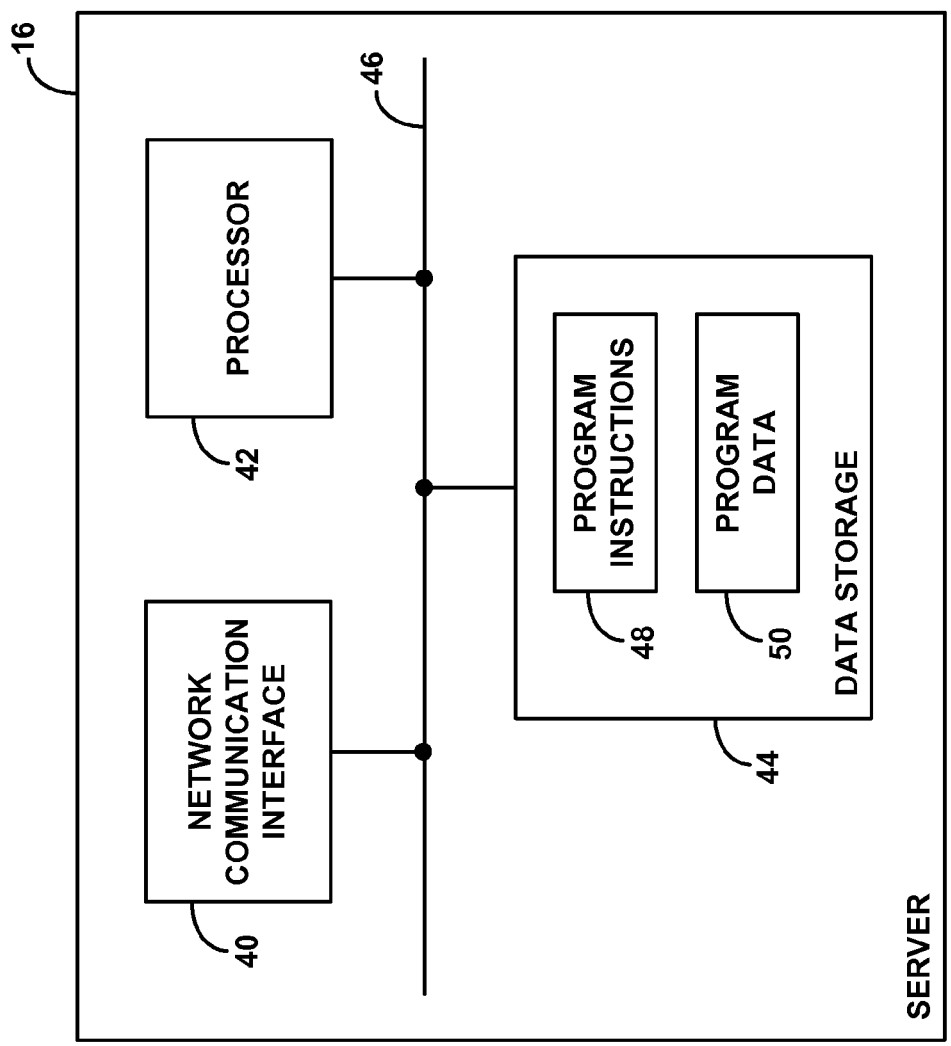
FIG. 7 is a simplified block diagram of a server operable within the method.

The server 16 may be any computing device that is arranged to receive a request for streaming media and to stream the requested media for playout. As such, the server would likely be a server class computer. However, the server could be more simple, such as one of the devices described above yet arranged with logic to operate as a server. FIG. 7 is a simplified block diagram showing components that can be included in such a server to facilitate carrying out aspects of the method in practice.

As shown in FIG. 7, the example server includes a network communication interface 40, a processor 42, and data storage 44, all of which may be coupled together by a system bus or other connection mechanism 46.

Network communication interface 40 may comprise a wired or wireless interface arranged to allow the server 16 to communicate on network 14 and with entities via network 14, such as with client 12 for instance. As such, the network communication interface 40 may comprise a wired or wireless Ethernet interface, a cellular wireless interface, or any other type of network interface.

Processor 42 may comprise one or more general purpose processors and/or one or more special purpose processors and may be integrated in whole or in part with network communication interface. And data storage 44 may comprise one or more volatile and/or non-volatile storage components and may be integrated in whole or in part with processor 42. As shown, data storage 44 contains program instructions 48 executable to carry out various server functions described herein, and program data 50 such as various VBR versions of media content to stream to client 12 for playout.

Figure 8:
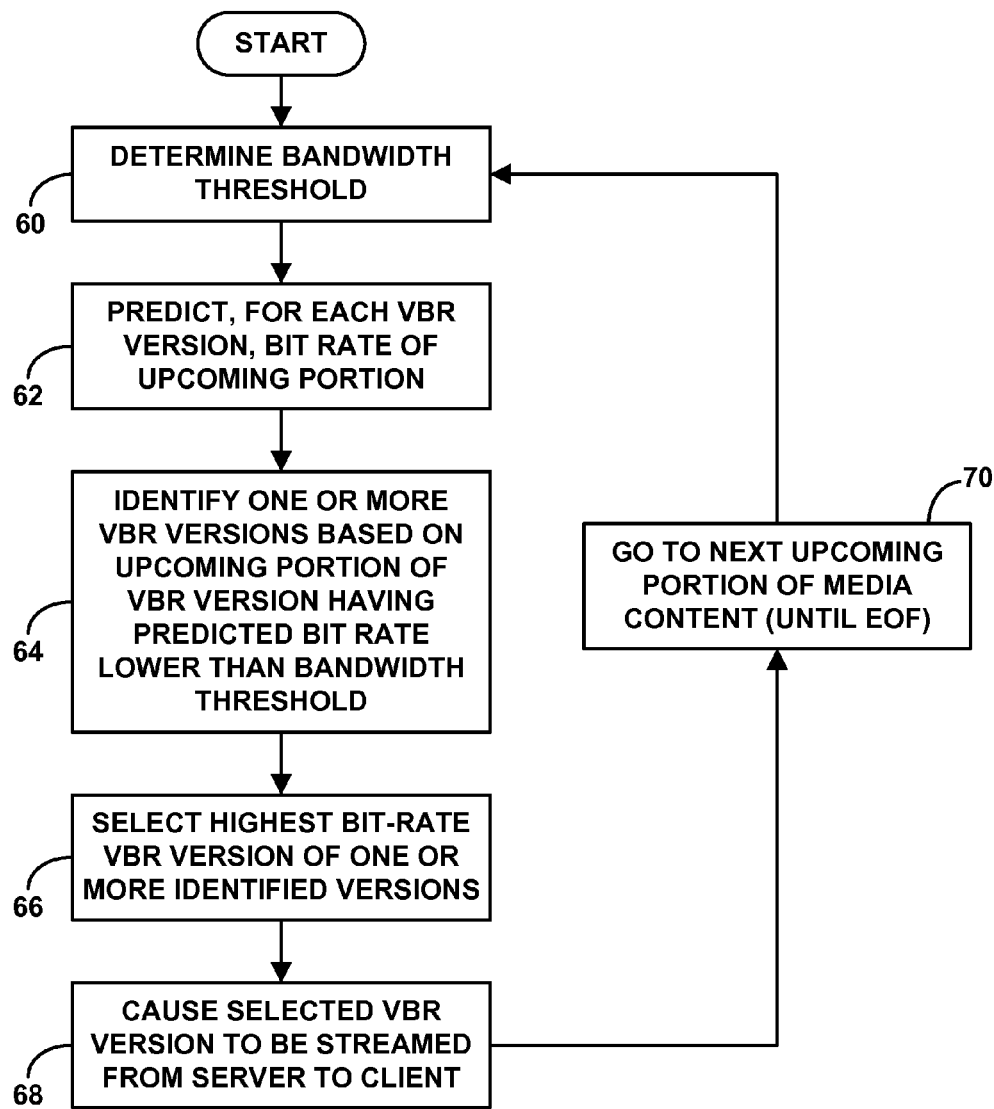
FIG. 8 is a flow chart depicting functions that can be carried out in accordance with the method.

FIG. 8 is next a flow chart depicting functions that could be carried out in accordance with an example implementation of the present method, to control streaming of media content from a server to a client, where the server has access to multiple VBR versions of the media content.

As shown in FIG. 8, at block 60, the example method involves determining a bandwidth threshold. The bandwidth threshold may be a real-time (i.e., current or substantially current) measure of the network bandwidth or some derivation of such a measure for instance. As such, the bandwidth threshold may change from time to time or may be constant and possibly even predetermined.

If carried out by the client, this function of determining the bandwidth threshold may involve the client draining its playback buffer and then allowing the buffer to fill with incoming data from the server, and measuring the rate at which the buffer fills, or otherwise measuring a rate of arrival of data at the client from the server. The client may then deem the measured rate or some multiple or offset version of the measured rate to be the bandwidth threshold. Alternatively, the client could determine the bandwidth threshold in some other manner and/or be informed of the bandwidth threshold by another entity. On the other hand, if the function is carried out by the server, the server may receive a report of network bandwidth or of the bandwidth threshold from the client or from one or more other entities in the communication path between the server and the client, or the server could determine the bandwidth in any other manner.

At block 62 (which may instead occur before block 60), the example method further involves predicting for each VBR version of the media content a bit rate of an upcoming portion of the media content. As noted above, for instance, this may involve referring to a media file index to predict a bit rate of the upcoming portion per VBR version. Further, if the predicted bit rates have already been established for each of a series of portions (e.g., sliding windows) of each VBR version, this function may involve referring to that already established predicted bit rate data to determine the predicted bit rate for the upcoming portion per VBR version.

At block 64, the example method then involves identifying one or more VBR versions of the media content based on the upcoming portion of the media content in each such VBR version having a predicted bit rate lower than the bandwidth threshold. (Note that the "lower than" test here could just as well encompass "less than or equal to", as the bandwidth threshold could be set just above or at the desired level.) In particular, the method may involve comparing the predicted bit rate for each VBR version respectively with the bandwidth threshold to identify one or more of the VBR versions in which the upcoming portion has a predicted bit rate lower than the bandwidth threshold.

The function of identifying the one or more VBR versions may also take into account one or more other factors other than whether the upcoming portion of the VBR version meets the bandwidth threshold. For instance, the identifying may also be based at least in part on a determination of how full the client's playback buffer is currently. In this regard, if the client's playback buffer is threshold empty (e.g., being dangerously close to running dry), it may be advantageous to select a lower bit-rate version than would otherwise be selected, as a lower bit-rate version would play out more slowly and may thus help to fill the buffer. Thus, if the identifying function is carried out by the client, the client may determine if its playback buffer is threshold empty and if so may adjust the bandwidth threshold down by some factor so as to force selection of a possibly lower bit-rate VBR version. Likewise, if the identifying function is carried out by the server, the client may report its buffer fullness to the server and the server may apply a similar adjustment so as to account for the buffer fullness. Other factors could be considered as well.

At block 66, the example method then involves selecting the highest bit-rate VBR version of the one or more identified VBR versions. If only one VBR version was identified, then this function would amount to selecting that VBR version. Whereas, if more than one VBR version was identified, then this function would involve selecting the VBR version that has the highest bit rate of the one or more identified VBR versions.

Note that this function of block 66 could be combined with that of block 64 in a different way. For instance, the function may involve first ranking the VBR versions, and then, in rank-order from highest bit-rate VBR version to lowest bit-rate VBR version, checking to see if the upcoming portion of the VBR version has a predicted bit rate lower than the bandwidth threshold. Proceeding in rank-order, once a VBR version is found to meet this bandwidth threshold test for its upcoming portion, the function would then involve selecting that VBR version as the version. With this process, the function of block 64 may involve identifying the highest ranked one of the VBR versions that has a predicted bit rate lower than the bandwidth threshold, and the function of block 66 may involve selecting that identified VBR version.

At block 68, the example method may then involve causing the server to stream the selected VBR version to the client. If this function is carried out by the client, for instance, this function may involve sending to the server a control command that directs the server to stream to the client the selected VBR version (or taking no action if the VBR version is the same as that currently being streamed to the client). If this function is carried out by the server, on the other hand, this function may involve transitioning to stream to the client the selected VBR version (or continuing to stream the VBR version if the version is that currently being streamed to the client).

At block 70, the example method may then involve proceeding to the next upcoming portion of the media content, until reaching an end of the media content file. In turn, the method may then involve repeating the process starting at block 60. As noted above, each portion of the media content may be defined over time or data quantity, and the portions may be discrete or overlapping (as a sliding window).

Figure 9:
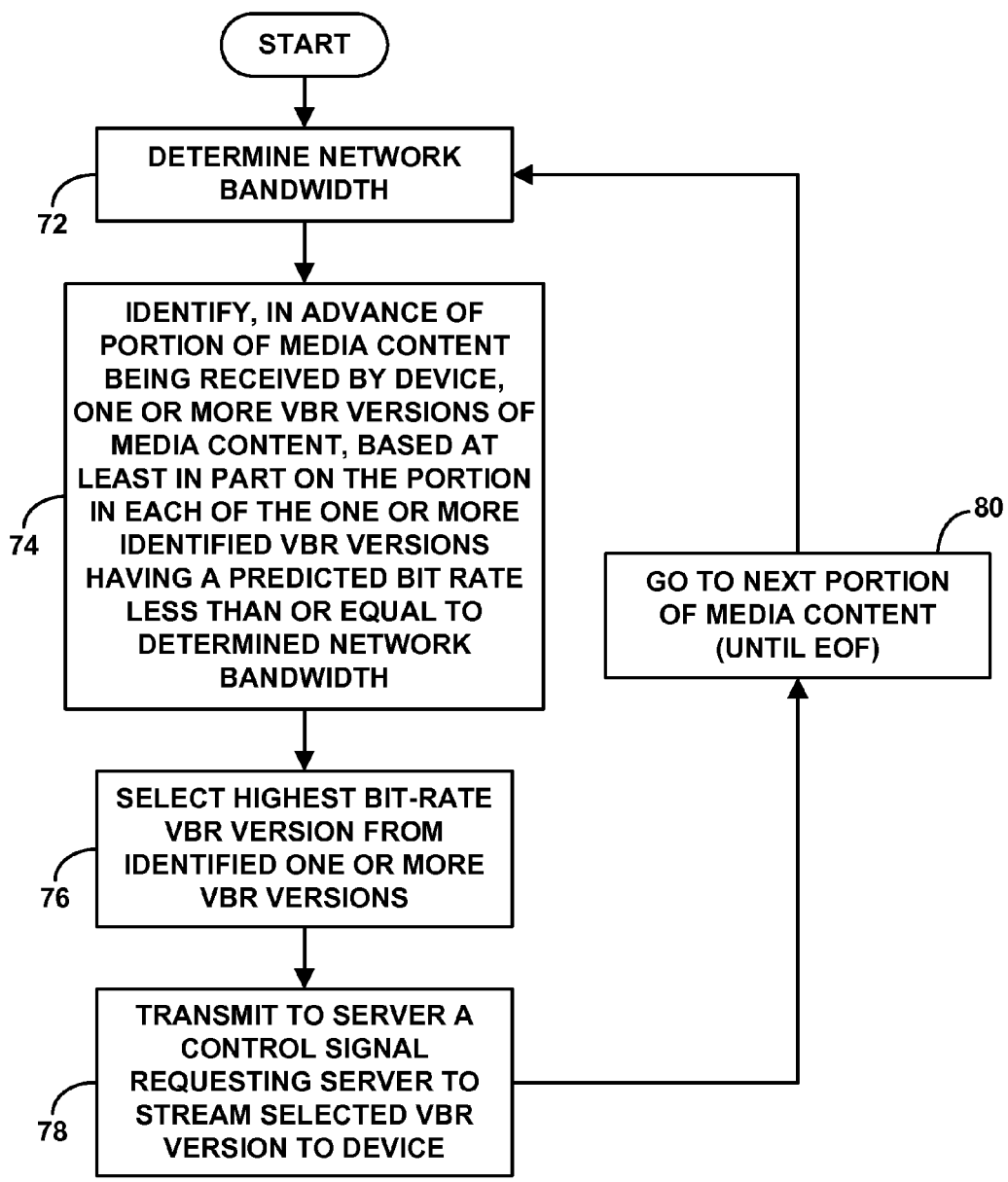
FIG. 9 is another flow chart depicting functions that can be carried out in accordance with the method.

FIG. 9 is next another flow chart depicting functions that could be carried out in accordance with an example implementation of the present method, to control streaming of media content from a server to a device. This method could be defined by instructions encoded on a non-transitory computer readable medium, such the data storage of client 12 for instance, which could be executable by a processor, such as processor 26 of client 12 for instance, to carry out various functions.

As shown in FIG. 9, at block 72, the example method involves determining network bandwidth for communication from the server to the device. At block 74, the example method then involves identifying, in advance of a portion of the media content being received by the device, one or more of multiple VBR versions of the media content, with the identifying being based at least in part on the portion of the media content in each of the one or more VBR versions having a bit rate less than or equal to the determined network bandwidth. At block 76, the example method then involves selecting, from the identified one or more VBR versions of the media content, a highest bit-rate VBR version of the media content. And at block 78, the example method involves transmitting to the server a control signal requesting the server to stream the selected VBR version of the media content to the device. At block 80, the example method then involves proceeding to a next sequentially occurring portion of the media content (e.g., on a sliding window basis or as a next discrete, mutually exclusive portion) until reaching an end of the media file, and repeating the method at block 72.

Definitions and discussions of analogous functions provided above in connection with the flow chart of FIG. 8 are applicable with respect to functions of FIG. 9 as well, and vice versa. For example, as noted above, the act of identifying one or more VBR versions could be based on playback buffer fullness. And as another example, the act of determining network bandwidth may involve determining a rate of arrival at the client device of data from the server and deeming the network bandwidth to be a value based on that measured rate of arrival.

Further, this example method and that described above could include still other functions or variations on the functions discussed. For instance, as discussed above, the method may involve receiving and storing an index of the media content, with the index including data representing bit rates of each VBR version over time. In that case, the function of identifying one or more of the VBR versions of the media content may involve using the index as a basis for the identifying, such as referring to the index to predict the bit rate of the upcoming portion of the media content per VBR version, and using those predicted bit rates as a basis to identify the one or more VBR versions.

As noted above, for example, the data in the index may specify for each VBR version sizes and durations of sequential chunks of the VBR version, and the function of using the index as a basis to identify the one or more VBR versions may involve (i) determining from the index a measure of chunk-size per time for the portion of the media content (such as an average or maximum), (ii) using the determined measure as a representation of bit rate of the portion of the media content, and (iii) determining that the VBR version is one in which the portion of the media content will have a bit rate less than or equal to the determined network bandwidth if the representation of bit rate of the portion of the media content is less than or equal to the determined network bandwidth.

Alternatively or additionally, the data in the index may specify for each VBR version a mapping between media content time positions and media content data positions, and the function of using the index as a basis to identify one or more VBR versions may involve (i) determining from the index a measure of media content data-size per time-range for the portion of the media content (e.g., an average or maximum), (ii) using the measure as a representation of bit rate of the portion of the media content, and (iii) determining that the VBR version is one in which the portion of the media content will have a bit rate less than or equal to the determined network bandwidth if the representation of bit rate of the portion of the media content is less than or equal to the determined network bandwidth.

Figure 10:
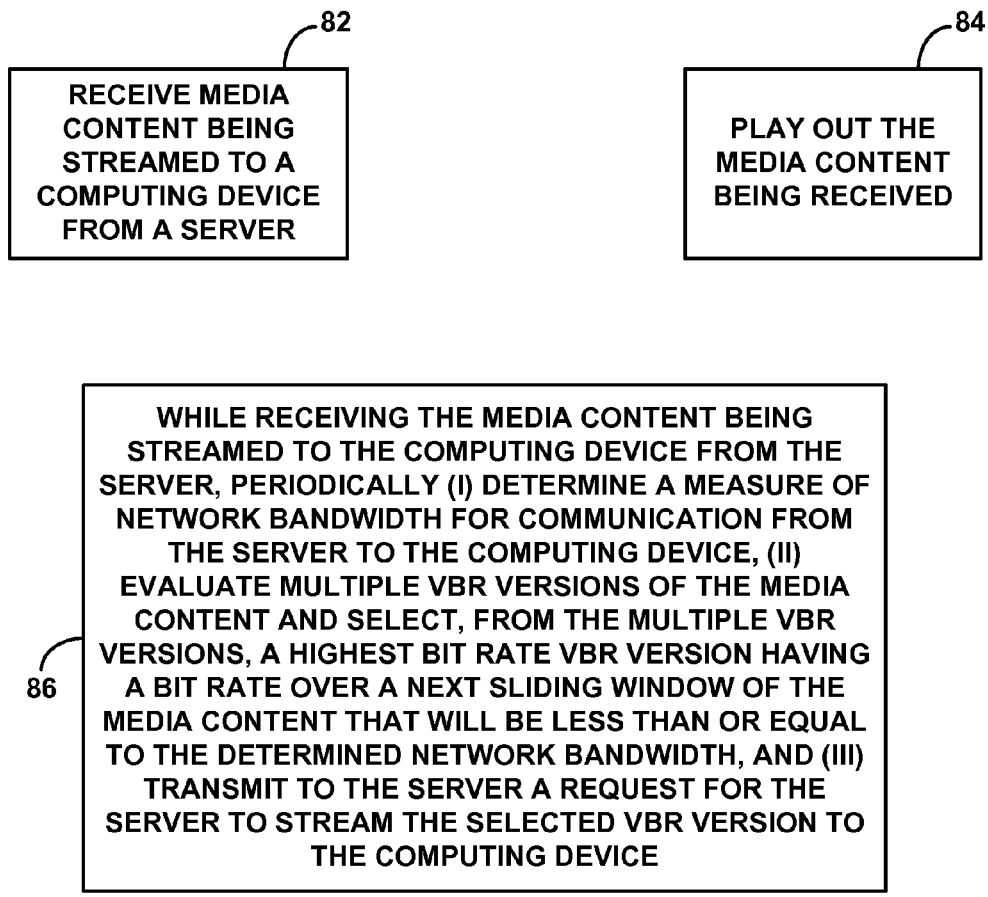
FIG. 10 is a further depiction of functions that can be carried out in accordance with the method.

Finally, FIG. 10 is yet another depiction of functions that can be carried out in accordance with an example implementation of the present method. These functions as well could be carried out by a computing device such as client 12 for instance. In particular, the data storage of such a device may store program instructions executable by a processor of the device to carry out the functions of the method.

As shown in FIG. 10, at block 82, the example method involves receiving, by the network communication interface, media content being streamed to the computing device from a server. At block 84, which may occur in parallel with block 82 for media content so far received, the example method further involves playing out, at the user interface, the media content being received. And at block 85, the example method involves, while receiving the media content being streamed to the computing device from the server, periodically (i) determining a measure of network bandwidth for communication from the server to the computing device, (ii) evaluating a multiple VBR versions of the media content and selecting, from the multiple VBR versions, a highest bit-rate VBR version having a bit rate over a next sliding window of the media content that will be less than or equal to the determined network bandwidth, and (iii) transmitting, by the network communication interface, to the server a request for the server to stream the selected VBR version to the computing device.

As with the discussion above, definitions and discussions of analogous functions provided above in connection with FIGS. 8 and 9 are applicable with respect to functions of FIG. 9 as well, and vice versa. For example, as noted above, during playout of media content, the data storage of the computing device may define a playback buffer for the media content, and the functions of the example method may further include selecting the highest bit-rate VBR version based on a level of fullness of the playback buffer. As another example, the data storage of the computing device may hold an index of the media content, and the computing device may use that index as a basis to determine a bit rate of each VBR version of the media content over the next sliding window of the media content, so as to facilitate selecting a highest bit-rate VBR version having a bit rate over the next sliding window of the media content that will be less than or equal to the determined network bandwidth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for controlling streaming of media content from a server to a client, wherein the server has access to a plurality of variable bit rate (VBR) versions of the media content, the method comprising carrying out the following functions for each of a plurality of sequentially occurring portions of the media content while the media content is being streamed from the server to the client:
   identifying, in advance of the portion of the media content being received by the client, one or more of the VBR versions of the media content, the identifying being based at least in part on determining that the portion of media content in each of the one or more VBR versions has a bit rate lower than a bandwidth threshold;
   selecting, from the determined one or more VBR versions of the media content, a highest bit-rate VBR version of the media content; and
   causing the selected VBR version of the media content to be streamed from the server to the client,
   the method further comprising storing an index of the media content, the index containing data representing bit rates of the VBR versions over time, wherein selecting, from the determined one or more VBR versions of the media content, a highest bit-rate VBR version of the media content comprises using the stored index as a basis for determining a bit rate of each VBR version of the media content over the next sequential portion of the media content.

2. The method of claim 1, wherein the identifying is further based at least in part on level of fullness of a playback buffer at the client.

3. The method of claim 1, wherein identifying, in advance of the portion of the media content being received by the client, one or more of the VBR versions of the media content comprises:
   for each VBR version of the plurality, predicting a measure of bit rate of the portion of the media content;
   determining for each VBR version of the plurality whether the predicted measure of bit rate of the portion of the media content is lower than the bandwidth threshold.

4. The method of claim 3, wherein the measure comprises an average or a maximum.

5. The method of claim 3, further comprising, for each of the plurality of sequentially occurring portions of the media content while the media content is being streamed from the server to the client:
   determining the bandwidth threshold based on evaluation of network bandwidth between the server and the client.

6. The method of claim 5, wherein the sequentially occurring portions of the media content overlap with each other to cooperatively define a sliding window over the media content.

7. The method of claim 5, wherein the sequentially occurring portions of the media content are mutually exclusive portions of the media content.

8. The method of claim 1, wherein causing the selected VBR version of the media content to be streamed from the server to the client comprises causing the server to transition from streaming another one of the VBR versions of the media content to streaming the selected VBR version of the media content.

9. The method of claim 1, carried out by the server,
   wherein the method further comprises receiving from the client a measure of network bandwidth, the bandwidth threshold being based on the received measure.

10. A non-transitory computer readable medium having stored thereon instructions executable to cause a device to carry out the following functions for each of a plurality of sequentially occurring portions of media content during streaming of the media content from a server to the device:
    determining network bandwidth for communication from the server to the device;
    identifying, in advance of the portion of the media content being received by the device, one or more of a plurality of variable bit rate (VBR) versions of the media content, the identifying being based at least in part on the portion of the media content in each of the one or more VBR versions having a bit rate less than or equal to the determined network bandwidth;
    selecting, from the identified one or more VBR versions of the media content, a highest bit-rate VBR version of the media content; and
    transmitting to the server a control signal requesting the server to stream the selected VBR version of the media content to the device,
    wherein the instructions are further executable to cause the device to receive and store an index of the media content, the index including data representing bit rates of the plurality of VBR versions over time, wherein the data in the index specifies, for each VBR version of the plurality, sizes and durations of sequential chunks of the VBR version,
    wherein identifying one or more of the VBR versions of the media content comprises using the index as a basis for the identifying, and
    wherein using the index as a basis for the identifying comprises (i) determining from the index a measure of chunk-size per time for the portion of the media content, (ii) using the determined measure as a representation of bit rate of the portion of the media content, and (iii) determining that the VBR version is one in which the portion of the media content will have a bit rate less than or equal to the determined network bandwidth if the representation of bit rate of the portion of the media content is less than or equal to the determined network bandwidth.

11. The non-transitory computer readable medium of claim 10, wherein the identifying is further based at least in part on a level of fullness of a playback buffer at the device.

12. The non-transitory computer readable medium of claim 10, wherein the device is a handheld wireless communication device, and wherein the non-transitory computer readable medium comprises data storage of the device.

13. The non-transitory computer readable medium of claim 10, wherein the measure of chunk size per time for the portion of the media content comprises an average or a maximum.

14. The non-transitory computer readable medium of claim 10, wherein determining network bandwidth for communication from the server to the device comprises measuring a rate of arrival of data at the device from the server, the network bandwidth being based at least in part on the measured rate of arrival.

15. The non-transitory computer readable medium of claim 10, wherein the sequentially occurring portions of the media content overlap with each other to cooperatively define a sliding window over the media content.

16. The non-transitory computer readable medium of claim 15, wherein the sliding window is size-bound or time-bound.

17. The non-transitory computer readable medium of claim 10, wherein the sequentially occurring portions of the media content are mutually exclusive.

18. The non-transitory computer readable medium of claim 10, wherein the control signal requests the server to transition from streaming another one of the VBR versions of the media content to the device to streaming the selected VBR version of the media content to the device.

19. A non-transitory computer readable medium having stored thereon instructions executable to cause a device to carry out the following functions for each of a plurality of sequentially occurring portions of media content during streaming of the media content from a server to the device:
    determining network bandwidth for communication from the server to the device;
    identifying, in advance of the portion of the media content being received by the device, one or more of a plurality of variable bit rate (VBR) versions of the media content, the identifying being based at least in part on the portion of the media content in each of the one or more VBR versions having a bit rate less than or equal to the determined network bandwidth;
    selecting, from the identified one or more VBR versions of the media content, a highest bit-rate VBR version of the media content; and
    transmitting to the server a control signal requesting the server to stream the selected VBR version of the media content to the device,
    wherein the instructions are further executable to cause the device to receive and store an index of the media content, the index including data representing bit rates of the plurality of VBR versions over time, wherein the data in the index specifies for each VBR version a mapping between media content time positions and media content data positions,
    wherein identifying one or more of the VBR versions of the media content comprises using the index as a basis for the identifying, and
    wherein using the index as a basis for the identifying comprises (i) determining from the index a measure of media content data-size per time-range for the portion of the media content, (ii) using the measure as a representation of bit rate of the portion of the media content, and (iii) determining that the VBR version is one in which the portion of the media content will have a bit rate less than or equal to the determined network bandwidth if the representation of bit rate of the portion of the media content is less than or equal to the determined network bandwidth.

20. The non-transitory computer readable medium of claim 19, wherein the measure comprises an average or a maximum.

21. The non-transitory computer readable medium of claim 19, wherein determining network bandwidth for communication from the server to the device comprises measuring a rate of arrival of data at the device from the server, the network bandwidth being based at least in part on the measured rate of arrival.

22. The non-transitory computer readable medium of claim 19, wherein the sequentially occurring portions of the media content overlap with each other to cooperatively define a sliding window over the media content.

23. The non-transitory computer readable medium of claim 22, wherein the sliding window is size-bound or time-bound.

24. The non-transitory computer readable medium of claim 19, wherein the sequentially occurring portions of the media content are mutually exclusive.

25. The non-transitory computer readable medium of claim 19, wherein the control signal requests the server to transition from streaming another one of the VBR versions of the media content to the device to streaming the selected VBR version of the media content to the device.

26. The non-transitory computer readable medium of claim 19, wherein the identifying is further based at least in part on a level of fullness of a playback buffer at the device.

27. The non-transitory computer readable medium of claim 19, wherein the device is a handheld wireless communication device, and wherein the non-transitory computer readable medium comprises data storage of the device.

28. A computing device comprising:
    a network communication interface;
    a user interface;
    a processor;
    data storage; and
    program instructions stored in the data storage and executable by the processor to carry out at least the following functions:
        (a) receiving, by the network communication interface, media content being streamed to the computing device from a server,
        (b) playing out, at the user interface, the media content being received; and
        (c) while receiving the media content being streamed to the computing device from the server, periodically (i) determining a measure of network bandwidth for communication from the server to the computing device, (ii) evaluating a plurality of variable-bit-rate (VBR) versions of the media content and selecting, from the plurality of VBR versions, a highest bit-rate VBR version having a bit rate over an upcoming sliding window of the media content that will be less than or equal to the determined network bandwidth, and (iii) transmitting by the network communication interface to the server a request for the server to stream the selected VBR version to the computing device, wherein the data storage holds an index of the media content, the index containing data representing bit rates of the VBR versions over time, wherein evaluating the plurality of VBR versions of the media content and selecting, from the plurality of VBR versions, a highest bit-rate VBR version having a bit rate over an upcoming sliding window of the media content that will be less than or equal to the determined network bandwidth comprises using the index as a basis for determining a bit rate of each VBR version of the media content over the upcoming sliding window of the media content.

29. The computing device of claim 28, wherein:
during the playing out of the media content, the data storage defines a playback buffer for the media content, and the functions further comprise selecting the highest bit-rate VBR version based on a level of fullness of the playback buffer.

30. The computing device of claim 28, wherein the request is for the server to transition from streaming another one of the VBR versions to streaming the selected VBR version.

* * * * *